(12) United States Patent
Liu et al.

(10) Patent No.: US 8,314,503 B2
(45) Date of Patent: Nov. 20, 2012

(54) GENERATORS USING BIO-KINETIC ENERGY

(75) Inventors: Jing Liu, Beijing (CN); Yueguang Deng, Zhijiang (CN)

(73) Assignee: Empire Technology Development LLC, Wilmington, DE (US)

( * ) Notice: Subject to any disclaimer, the term of this patent is extended or adjusted under 35 U.S.C. 154(b) by 349 days.

(21) Appl. No.: 12/709,060

(22) Filed: Feb. 19, 2010

(65) Prior Publication Data

US 2011/0204653 A1  Aug. 25, 2011

(51) Int. Cl.
F02B 63/04 (2006.01)
F03G 7/08 (2006.01)
H02K 7/18 (2006.01)

(52) U.S. Cl. .................................................. 290/1 R
(58) Field of Classification Search ................. 290/1 R, 290/54
See application file for complete search history.

(56) References Cited

U.S. PATENT DOCUMENTS

| | | | |
|---|---|---|---|
| 5,135,825 A | 8/1992 | Mori et al. | |
| 5,495,682 A | 3/1996 | Chen | |
| 6,201,314 B1 | 3/2001 | Landry | |
| 6,768,246 B2 | 7/2004 | Pelrine et al. | |
| 2001/0035723 A1 | 11/2001 | Pelrine et al. | |
| 2008/0306359 A1* | 12/2008 | Zdeblick et al. | 600/302 |

FOREIGN PATENT DOCUMENTS

| | | |
|---|---|---|
| CN | 201222695 | 4/2009 |
| CN | 101599686 | 12/2009 |
| CN | 101645674 | 2/2010 |
| FR | 2745476 | 3/1996 |

OTHER PUBLICATIONS

Chris Gourlay "Light fantastic: pedestrians to generate power" [online: http://www.timesonline.co.uk/tol/news/environment/article4087518.ece] Jun. 8, 2008, 2 sheets.
Weldon Payne "UTSI Developing MHD Generator" [Online: http://web.archive.org/web/20060709223121/http://www.utsi.edu/news/release12-1-04mhdgeneratorhtml] Dec. 1, 2004, 3 sheets.
Beatrice Garcia, et al "Aluminium Corrosion in Room Temperature Molten Salt," Journal of Power Sources, 2004 132(1-2), 206-208, 3 sheets.
Krassen Dimitrov "Charging of Batteries through Human Motion: First Principle Analysis" [online: http://www.nanostring.net/M2E/M2E_Study.pdf], 15 sheets.

(Continued)

*Primary Examiner* — Javaid Nasri
(74) *Attorney, Agent, or Firm* — Workman Nydegger

(57) ABSTRACT

Devices for converting bio-kinetic energy into electrical energy. Devices may include a fluid conduit configured to contain a liquid conductive material, a transducer coupled to the fluid conduit and configured to drive flow of the liquid conductive material through the fluid conduit, and a magnetohydrodynamic (MHD) power generation unit operatively coupled to the fluid conduit, wherein the MHD power generation unit is configured to convert liquid conductive material flow through the fluid conduit into electrical power. Devices may be incorporated into a number of wearable articles and building articles for conversion of bio-kinetic energy into electrical energy.

19 Claims, 7 Drawing Sheets

OTHER PUBLICATIONS

J. Sun, et al "Room-Temperature Molten Salts Based on the Quaternary Ammonium Ion" The Journal of Physical Chemistry B 1998 102 (44), 8858-8864, 7 sheets.

PESWiki "Directory: Strike—Heel Generation," accessed at http://peswiki.com/index.php/Directory:Strike-Heel_Generation, last modified on Jun. 20, 2008, 6 pages.

Wikipedia, "MHD generator," accessed at http://en.wikipedia.org/wiki/MHD_generator, last modified on Apr. 7, 2012, 9 pages.

"Pedestrians generate (even more) electricity at Shibuya station," accessed at http://www.digitalworldtokyo.com/index.php/digital_tokyo/articles/pedestrians_generate_electricity_at_shibuya_station/, Dec. 8, 2008, 4 pages.

Jia, D., et al., "Harvesting human kinematical energy based on liquid metal Magnetohydrodynamics" Physics Letters A, vol. 373, Issue 15, pp. 1305-1309 (2009).

* cited by examiner

GENERATORS USING BIO-KINETIC ENERGY

BACKGROUND

In humans and other animals, normal body function involves many energy consuming activities. A great deal of energy is consumed by bodily locomotion such as walking and running. However, most of the mechanical energy used for these functions is not reused, but is instead returned to the environment as thermal energy.

A body energy harvesting system, for example, can harvest mechanical energy from body movements and transform it into electrical energy. Since most body movements (e.g., human movements) are unpredictable, body energy harvesting systems have generally been restricted to capturing energy from regular movements in certain activities at the cost of increased metabolic activity of the subject.

SUMMARY

In one embodiment, a device for generating electrical power is disclosed. The device may include a fluid conduit configured to contain a liquid conductive material (e.g., a molten salt or a liquid metal), a transducer coupled to the fluid conduit and configured to drive flow of the liquid metal through the fluid conduit, and a magnetohydrodynamic (MHD) power generation unit operatively coupled to the fluid conduit, wherein the MHD power generation unit is configured to convert liquid metal flow through the fluid conduit into electrical power.

In one aspect, the transducer is configured to harvest body movement to drive flow of the liquid conductive material through the fluid conduit. In one example aspect, the transducer may be coupled to a fluid conduit that is arranged to form a reciprocal flow path such that the transducer can drive cyclical flow of the liquid conductive material through the device to generate electrical power.

In one aspect, the MHD power generation unit includes a magnet configured to form magnetic field lines, wherein the magnetic field lines are aligned substantially perpendicular to a liquid conductive material flow path in the fluid conduit, and at least one pair of electrodes coupled to the fluid conduit substantially perpendicular to the magnetic field lines, wherein the electrodes are configured to collect an output electrical current produced by the MHD power generation unit.

In another embodiment, a wearable article is disclosed. In one aspect, the wearable article includes a liquid metal magnetohydrodynamic generator (LMMG) that is configured to convert bio-kinetic energy into electrical energy. For example, the wearable article could be worn by a human and can be configured to convert body movement into electrical energy that can be used to power an electrical device or to charge a battery.

In one aspect, the LMMG includes a fluid conduit configured to contain a liquid metal, a transducer coupled to the fluid conduit and configured to drive flow of the liquid metal through the fluid conduit, and a magnetohydrodynamic (MHD) power generation unit operatively coupled to the fluid conduit, wherein the MHD power generation unit is configured to convert liquid metal flow through the fluid conduit into electrical power.

In yet another embodiment, a building element is disclosed. In one aspect the building element includes a liquid metal magnetohydrodynamic generator (LMMG) that is operatively coupled to the building element for conversion of bio-kinetic energy into electrical energy. For example, the building element can include a flooring article in which liquid metal flow through the LMMG is driven by pressures and other forces induced by movement on the flooring article, where liquid metal flow through the LMMG is converted to electrical power.

The foregoing summary is illustrative only and is not intended to be in any way limiting. In addition to the illustrative aspects, embodiments, and features described above, further aspects, embodiments, and features will become apparent by reference to the following detailed description.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only illustrated embodiments of the disclosure and are therefore not to be considered limiting of its scope. The disclosure will be described and explained with additional specificity and detail through the use of the accompanying drawings in which.

DETAILED DESCRIPTION

I. Introduction

Figure 1:
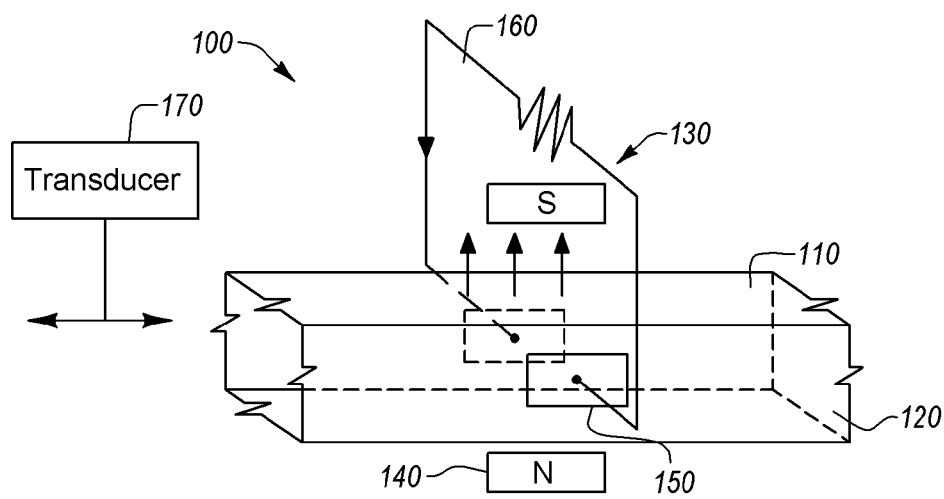
FIG. 1 provides a schematic of an illustrative embodiment of a magnetohydrodynamic power generation unit.

In the following detailed description, reference is made to the accompanying Figures, which form a part hereof. In the Figures, similar symbols typically identify similar components, unless context dictates otherwise. The illustrative embodiments described in the detailed description, Figures, and claims are not meant to be limiting. Other embodiments may be utilized, and other changes may be made, without departing from the spirit or scope of the subject matter presented here.

Devices are disclosed for converting bio-kinetic energy into electrical energy. In particular, magnetohydrodnamic (MHD) devices are disclosed that can be coupled to body movements for converting bio-kinetic energy into electrical energy. The devices described herein can harvest bio-kinetic energy for the production of electrical energy without significantly increasing metabolic activity. The electrical energy produced by the device can be used to power an electrical appliance or the electrical energy can be stored in a storage device for use when it is needed.

As used herein, the terms "magnetohydrodynamic" and "MHD" refer to a process for electric power generation in which an electrically conducting fluid or plasma is flowed through a channel with a magnetic field applied across the channel substantially perpendicular to the direction of flow. Electrical power generated in the MHD is harvested by electrodes placed at right angles to flow and field.

In the present disclosure, a Liquid Metal Magnetohydrodynamic Generator (LMMG) is proposed for harvesting energy from body movements. As used herein, the terms "Liquid Metal Magnetohydrodynamic Generator" and "LMMG" refer to a MHD generator that produces electricity by flowing a liquid metal through a magnetic field. In one example, an LMMG can be incorporated into a wearable article and attached to part of a human or animal body (e.g., an arm, leg, or foot) where it can be used to harvest energy from body movement. In another example, an LMMG can be incorporated into a building article such as a flooring article where it can be used to harvest energy from movements (e.g., walking movements) over the building article.

The electrical power generated from the LMMG devices described in the present disclosure can be used to power essentially any type of electrical device. The LMMG devices described herein can be used alone to generate usable power or it can be used to provide power to supplement electricity obtained from traditional sources, such as a municipal power station. If greater amounts or power are needed or desired, multiple LMMG generator units (e.g., at least two, three, five, ten, twenty, fifty, 100 s, or 1000 s of LMMG generator units) can be connected electrically to produce greater amounts of electrical power.

As used herein, the term "liquid conductive material" refers to a metallic material or a salt having a melting point at a temperature less than or equal to, for example, about 40° C., about 35° C., about 30° C., about 25° C., about 20° C., about 15° C., or any temperature therebetween that is electrically conductive.

As used herein, the term "liquid metal" refers to either a single metal or a metal alloy having a melting point at a temperature less than or equal to, for example, about 40° C., about 35° C., about 30° C., about 25° C., about 20° C., about 15° C. Two metallic elements, mercury and gallium, are known to be liquid in this temperature range. Mercury has melting point of about −39° C. and gallium has a melting point of about 30° C. Many metallic alloys are also known to be liquid in these temperature ranges. For example, NaK alloys that include about 40 to 90 weight percent of potassium and about 60 to 10 weight percent of sodium are known to be liquid at room temperature (about 20° C.) and below. However, NaK alloys are highly reactive with air or water and must be handled with special care. In another example, many alloys of gallium that include at least one of indium, tin, and/or zinc are known to be liquid in these temperature ranges. For instance, a gallium alloy commonly commercially known as Galinstan has a melting point of about 19° C. Galinstan consists of 68.5 weight percent gallium, 21.5 weight percent indium, and 10 weight percent tin. Due to the low toxicity and low reactivity of its component metals, Galinstan and other liquid gallium alloys find use as replacements for many applications that previously employed toxic liquid mercury or reactive NaK.

As used herein, the term "molten salt" refers to either a salt that is molten at a temperature less than or equal to, for example, about 40° C., about 35° C., about 30° C., about 25° C., about 20° C., about 15° C., or any temperature therebetween. Examples of molten salts that are molten in these temperature ranges include, but are not limited to, an aluminum halide and at least one of a 1,3-dialkylimidazolium halide, a 1,2,3-trialkylimidazolium halide, and/or a N-alkylpyridinium halide, quaternary ammonium salts based on the bis(trifluoromethylsulfonyl)imide and triflate anions, and Ethyl-methyl-imidazolium bis(trifluoromethane-sulfonyl) imide (EMI-TFSI).

II. Devices for Generating Electrical Power

In the following description, reference is made to the accompanying Figures, which form a part hereof. In the accompanying Figures, similar reference numeral and/or symbols typically identify similar components, unless context dictates otherwise. The illustrative embodiments described in the detailed description, Figures, and claims are not meant to be limiting. Other embodiments may be utilized, and other changes may be made, without departing from the spirit or scope of the subject matter presented here.

In one embodiment, a device for generating electrical power is disclosed. According to the present disclosure, the device can include a fluid conduit configured to contain a liquid conductive material, a transducer coupled to the fluid conduit and configured to drive flow of the liquid conductive material through the fluid conduit, and a magnetohydrodynamic (MHD) power generation unit operatively coupled to the fluid conduit. The MHD power generation unit is configured to convert flow of the liquid conductive material through the fluid conduit into electrical power.

In one embodiment, the device may be integrated into a wearable article or a building element for conversion of bio-kinetic energy into electrical energy. For example, the device can be incorporated into a wearable article configured to be worn on the arm, leg, shoulder, hip, or foot of a human or an animal. Suitable examples of wearable articles include, but are not limited to, clothing articles such as shirts or pants, footwear articles such as shoes or insoles, and wearable accessories such as wrist bands or bangles. The device may also be integrated into a mobile electronic device, such as but not limited to, mobile phones, PDAs, and MP3 players or an implantable device such as, but not limited to, a cardiac pacemaker. Suitable examples of building articles include, but are not limited to, flooring articles such as flooring tiles, carpeting, hardwood flooring, bamboo flooring, cork flooring, synthetic wood flooring, steps, step risers, and combinations thereof.

In one embodiment, the fluid conduit included in the device may be arranged to form a reciprocal flow path such that the liquid conductive material can be recycled through the device. This may, for example, allow electrical power to be generated with a relatively small volume of liquid conductive material. In one example, the fluid conduit can be arranged to form a substantially closed loop such that reciprocal flow of liquid conductive material through the MHD power generation unit can be utilized for generation of electrical power in a cyclical fashion. In another example, the fluid conduit can be coupled to a reservoir of liquid conductive material such that flow of the liquid conductive material out of or into the reservoir can be coupled to electrical power generation.

In one embodiment, the fluid conduit may be fabricated from a material that is not electrically conductive or magnetically active. Suitable materials that may be used to fabricate the conduit may include, but are not limited to, fiberglass, ceramics, plastics, metals that are treated to be electrically non-conductive, wood, concrete, and the like. Suitable examples of plastics that can be used include, but are not limited to, Teflon (PTFE), polyethylene (PE), polypropylene (PP), polyvinyl chloride (PVC), polystyrene (PS), and the like. Generally speaking, metals cannot be used to fabricate the fluid conduit because they are usually conductive and some metals (e.g., aluminum) are rapidly corroded by liquid metal. Nonetheless, some metals can be used if they are coated or otherwise treated (e.g., paint and/or surface oxidation) to eliminate surface conductivity and to enhance their corrosion resistance as the structure material. For example, 1Cr18Ni9 stainless steel can show excellent corrosion resistance with liquid metal. What is more, good coating technology can also prevent the corrosion between liquid metal and the structure metals.

The fluid conduit's cross-section can be, but is not limited to, circular, square, triangle, oval, rectangular or another irregular shape. In one embodiment, the fluid conduit has a circular cross-section, a shape that has the smallest frictional effect. In some embodiments, at least part of the fluid conduit may be made of a flexible material configured to deform in response to pressure so that a force exerted on the fluid conduit may be capable of inducing flow of the liquid conductive material in the fluid conduit. In other embodiments, the fluid conduit may be made from a relatively rigid material. For example, use of a rigid fluid conduit may allow efficient coupling of flow of the liquid conductive material to electricity generation because forces inducing flow will tend to not be lost in expansion/contraction of the fluid conduit.

In one aspect of the device, the transducer is linked to the fluid conduit and configured to harvest energy from body movement by driving flow of the liquid conductive material through the fluid conduit and, in turn, through the MHD power generation unit. In one embodiment, the transducer may include a pressure sensitive cell configured to drive flow of the liquid conductive material through the fluid conduit when a pressure is applied to the pressure sensitive cell. For example, the transducer can be bladder, reservoir, vesicle, or another container made from a resilient or flexible material, such as an extruded thermoplastic material, a natural rubber, a synthetic rubber, and the like. When pressure is applied to the transducer in the present example, the transducer can deform and force liquid to flow through the fluid conduit and through the MHD power generation unit for the generation of electrical power. In one embodiment, the transducer and the fluid conduit can both be made of a flexible/resilient material such that the transducer and the fluid conduit can each be deformed in response to an applied pressure.

In another aspect, the transducer may include a flow cell configured to drive flow of the liquid conductive material through the fluid conduit when the device is moved. For example, the flow cell can include a reservoir of liquid conductive material and a fluid conduit connected to the reservoir such that swinging the flow cell back and forth causes the liquid to flow from the reservoir, through the fluid conduit and through the MHD power generation unit for electrical power generation, and back to the reservoir.

In one embodiment, the fluid conduit included in the device may include at least one valve configured to ensure unidirectional flow of the liquid conductive material. For example, a valve configured to ensure unidirectional flow of the liquid conductive material can ensure that liquid flows in only one direction in response to pressure being applied to the transducer. In another example, a valve configured to ensure unidirectional liquid flow can ensure that liquid flows in only one direction when a wearer's arm swings back and forth.

Unidirectional flow of liquid through the fluid conduit and, in turn, through the MHD power generation unit is not needed for electricity generation, per se. That is, electricity will be generated by flow of the liquid conductive material through the MHD power generation unit regardless of the direction of flow. However, if the direction of flow changes, the polarity of the electrical current will also change producing an alternating current.

Such an alternating current can be transformed into a direct current using a rectification circuit. However, because the output voltage of MHD is generally in the mV range, rectification generally requires a complex and expensive rectification circuit. It is therefore more practical and cost-effective to achieve voltage rectification mechanically with the use of a one-way valve to ensure unidirectional flow.

In one embodiment, the MHD power generation unit included in the device includes a magnet configured to form magnetic field lines, and at least one pair of electrodes coupled to the fluid conduit substantially perpendicular to the magnetic field lines. The magnetic field lines are aligned substantially perpendicular to the flow path of the liquid conductive material. The electrodes are configured to collect an output electrical current produced by the MHD power generation unit. In one embodiment, a conductive element can be coupled to the electrodes to output the electrical current collected by the electrodes and to deliver the output electrical current to a peripheral device.

In one embodiment, the peripheral device can include an electrical appliance, such as, but not limited to, a portable music player, a computer, a lighting device, and the like. In another embodiment, the peripheral device may include a power processing module and an electricity storage module linked to the conductive element. The power processing module may include a filter module, a DC to DC converter, and a voltage stabilization module. In another embodiment, the filter module may include a rectification circuit configured to convert alternating current to direct current. In yet another embodiment, the DC to DC converter may be replaced with a DC to AC converter if alternating current is desired. In one embodiment, the electricity storage module includes but is not limited to one or more of a lithium-ion battery (Li-ion), a nickel-cadmium battery (Ni—Cd), a sealed lead acid battery (SLA), a nickel-metal hydride battery (NiMH), a lithium sulfur battery (LiS), a thin film battery, or a capacitor.

In one embodiment, the magnet included in the MHD power generation unit includes but is not limited to one or more of a ferrite, a transition metal magnetic alloy, or a rare earth magnetic alloy. Ferrites have the general formula $AB_2O_4$, where A and B represent various metal cations, usually including iron. Ferrites are typically used to make permanent magnets, ferrite cores for transformers, and in various other high tech applications. Suitable examples of ferrites include $Fe_3O_4$, $ZnFe_2O_4$, manganese-zinc (MnZn, with the formula $Mn_aZn_{(1-a)}Fe_2O_4$), and nickel-zinc (NiZn, with the formula $Ni_aZn_{(1-a)}Fe_2O_4$). Additional magnetic materials include alloys consisting of aluminum, nickel, cobalt, iron, and small amounts of other elements (e.g., Alnico), alloys consisting of titanium, cobalt, nickel, iron, and small amounts of other elements (e.g., Ticonal), alloys of transition metals (i.e., CoZnTa, Fe—Al—O, Fe—Hf—O, Co—Fe—Hf—O, Co—Ta—Hf, Co—Nb—Zn) and rare earth magnets (e.g., samarium-cobalt and neodymium-iron-boron).

Electricity production in the MHD power generation unit is a function of magnetic field strength and the velocity of flow of the liquid conductive material. One will appreciate, therefore, that irrespective of the material used to fabricate the magnet, the magnet should be capable of producing a magnetic field sufficient to produce electrical energy from flow of the liquid conductive material through the MHD power generation unit. In general, the higher the magnetic field, the greater the amount of electricity that can be produced from flow at a given velocity. In one embodiment, the magnet has a magnetic field strength in a range from about 10 gauss (G) to about 20,000 G, about 100 G to about 10,000 G, about 1000 G to about 10,000 G, or any value therebetween.

In one embodiment, the liquid conductive material is a liquid metal. The liquid metal can be a single metal or a blend of metals including one or more of mercury, potassium, sodium, gallium, indium, tin, or zinc. In one embodiment, the liquid metal has a melting point less than or equal to about 40° C., about 35° C., about 30° C., or about 20° C., or any value therebetween.

Mercury and gallium are the only metallic elements known to be liquid in these temperature ranges. Elemental mercury has a melting point of about −39° C. and elemental gallium has a melting point of about 30° C.

Many gallium alloys are also known to be liquid in the recited temperature ranges. In one embodiment, the liquid metal includes a gallium alloy having about 20 to about 95 weight percent gallium, about 0 to about 30 weight percent indium, about 5 to about 60 weight percent tin, and about 0 to about 20 weight percent zinc. The gallium alloys are so-called eutectic alloys. A eutectic alloy is a mixture of chemical compounds or elements that has a single chemical composition that has melting point lower temperature than any single component of the composition. For example, Gallium melts at about 30° C. and tin melts at about 232° C., yet an alloy of gallium and tin that includes about 8 wt % tin melts at about 20° C. Shown below in Table 1 are a number of non-limiting examples of liquid metals having a melting point below about 20° C. As one will appreciate, the melting point of the alloys can be tailored by altering the relative proportions of each of the metals. In the table, the numbers in the liquid metal compositions refer to the weight percent (wt %) of the metal. For example, Ga71In15Sn13Zn1 includes 71 wt % Ga, 15 wt % In, 13 wt % Sn, and 1 wt % Zn.

TABLE 1

Liquid metals with melting point below about 20° C.

| Liquid metal | Melting point (° C.) |
| --- | --- |
| Hg | −38.87 |
| K78Na22 | −11.1 |
| Ga71In15Sn13Zn1 | 3 |
| Ga62.5In21.5Sn16 | 10.7 |
| Ga30Sn60In10 | 12 |
| Ga75In25 | 16 |
| Ga72Zn16In12 | 17 |
| Ga92Sn8 | 20 |
| Ga62In25Sn13 | 5 |
| Ga69.8In17.6Sn12.6 | 10.8 |
| Ga67In29Zn4 | 13 |
| Ga88Sn12 | 17 |

In one embodiment, the liquid conductive material is a molten salt that is molten at a temperature less than or equal to about 40° C., about 35° C., about 30° C., or about 20° C., or any value therebetween. Examples of molten salts that are molten in these temperature ranges include, but are not limited to, an aluminum halide and at least one of a 1,3-dialkylimidazolium halide, a 1,2,3-trialkylimidazolium halide, and/or a N-alkylpyridinium halide, quaternary ammonium salts based on the bis(trifluoromethylsulfonyl)imide and triflate anions, and Ethyl-methyl-imidazolium bis(trifluoromethanesulfonyl)imide (EMI-TFSI). Additional discussion of molten salts based on aluminum halide and at least one of a 1,3-dialkylimidazolium halide, a 1,2,3-trialkylimidazolium halide and methods for their preparation can be found in U.S. Pat. No. 5,135,825 to Mori et al entitled "METHOD FOR PRODUCING AMBIENT TEMPERATURE MOLTEN SALT CONSISTING OF CERTAIN PYRIDINIUM AND IMIDAZOLIUM HALIDES AND AN ALUMINUM TRIHALIDE," the entirety of which is incorporated herein by reference. Additional discussion of molten salts based on quaternary ammonium salts including bis(trifluoromethylsulfonyl)imide and triflate anions can be found in the "ROOM-TEMPERATURE MOLTEN SALTS BASED ON THE QUATERNARY AMMONIUM ION," J. Sun, M. Forsyth, and, D. R. MacFarlane, The Journal of Physical Chemistry B 1998 102 (44), 8858-8864, the entirety of which is incorporated herein by reference. Additional discussion of molten salts including Ethyl-methyl-imidazolium bis(trifluoromethane-sulfonyl)imide can be found in "ALUMINIUM CORROSION IN ROOM TEMPERATURE MOLTEN SALT," Beatrice Garcia, Michel Armand, Journal of Power Sources, 2004 132(1-2), 206-208, the entirety of which is incorporated herein by reference.

In one embodiment, the present disclosure describes a wearable article that includes a liquid metal magnetohydrodynamic generator (LMMG) configured to convert bio-kinetic energy into electrical energy, the LMMG including: a fluid conduit configured to contain a liquid metal, a transducer coupled to the fluid conduit and configured to drive flow of the liquid metal through the fluid conduit, and a magnetohydrodynamic (MHD) power generation unit operatively coupled to the fluid conduit. The MHD power generation unit is configured to convert the liquid metal flow through the fluid conduit into electrical power.

In one embodiment, the wearable article includes a clothing article, a footwear article, or a wearable accessory. For example, the wearable article can be a footwear article such as a shoe, boot, sandal, sock or any other type of foot covering with a transducer that comes between foot and ground such that liquid metal flow through the LMMG can be driven by body locomotion. In an illustrative example, the LMMG can be included in the heel of a shoe. However, it is to be understood that the LMMG does not necessarily have to be incorporated into the heel of a shoe, it may be incorporated anywhere into a footwear article that receives force when the foot contacts the ground during walking, running, jumping, or another body locomotion movement.

One will also understand that the device can be made integral to a footwear article, or that the device can be incorporated into a device used with the footwear such as, but not limited to, an insole or a sock. In either configuration, the device may be detachable from the footwear article and the footwear article may further include an attachment such as, but not limited to, a hook or a depression for attaching the device to the footwear article.

In another embodiment, the wearable article can be a bangle or band configured to be worn on a wrist or ankle portion of an arm or leg. For example, the bangle or band can be configured to couple the swinging movement of the arms or legs produced during walking or running to liquid metal flow and electricity generation.

In one embodiment of the disclosure, a building element that includes an LMMG for electricity generation is disclosed. The building element includes a liquid metal magnetohydrodynamic generator (LMMG) integrated into the building element for conversion of bio-kinetic energy into electrical energy. The LMMG includes a fluid conduit configured to contain a liquid metal, a transducer coupled to the fluid conduit and configured to drive flow of the liquid metal through the fluid conduit, and a magnetohydrodynamic (MHD) power generation unit operatively coupled to the fluid conduit. The MHD power generation unit is configured to convert liquid metal flow through the fluid conduit into electrical power.

For example, the MHD power generation unit can be embedded in a flooring article such as, but not limited to, a flooring tile, carpeting, hardwood flooring, bamboo flooring, cork flooring, synthetic wood flooring, step risers, and combinations thereof for harvesting bio-kinetic energy, e.g., human/animal walking/running motion. It can not only provide a new energy supply for room electrical equipment so as to, e.g., reduce building energy consumption, but also provide effective power supply that can be used during an interruption of power service (e.g., during a black-out). This is particularly suitable in areas where pedestrian flow is dense.

The various elements of the system may be similar to those incorporated in a wearable article, but may be in a larger scale. In some embodiments, the liquid metal flow channel and MHD power generation unit are embedded in the step/floor, while the transducer (e.g., a pressure cell) is on the surface. The output electricity power can be either directly provided to room electrical equipments after being regulated, or can be transported to a storage component or the grid for storage and utilization.

Referring now to FIG. 1, a schematic of an illustrative embodiment of a device to generate electric power is provided. The device 100 includes a fluid conduit 110 configured to contain a liquid conductive material 120, a magnetohydrodynamic (MHD) power generation unit 130 configured to couple flow of the liquid conductive materials 120 through the fluid conduit 110 and through the MHD 130 to generation of electrical power, and a transducer 170 coupled to the fluid conduit 110 to drive flow of the liquid conductive material 120 through the fluid conduit 110. As discussed in greater detail herein, suitable examples of liquid conductive materials 120 that can be contained in the fluid conduit 110 include, but are not limited to, liquid metals and molten salts. The fluid conduit's 110 cross section may be circular, square, triangle, oval, rectangular or other irregular shape. The material used to fabricate the fluid conduit 110 should be electrically non-conductive and not magnetically active (i.e., it should not be attracted by a magnetic field), and be compatible with the liquid conductive material 120. Suitable materials that may be used to fabricate the fluid conduit 110 may include, but are not limited to, fiberglass, ceramics, plastics, wood, concrete, metal that are treated to be electrically non-conductive, and the like.

The MHD power generation unit 130 includes a magnet 140 that is arranged with respect to the fluid conduit 110 such that the field generated by the magnet 140 is substantially perpendicular to the direction of the flow of the liquid conductive material through the fluid conduit 110. For example, a north pole (N) of the magnet 140 can be arranged below the fluid conduit 110 and a south pole (S) of the magnet 140 can be arranged over the fluid conduit 110 so that a magnetic field is vertically generated in the fluid conduit 110. So arranged, electricity will be generated when liquid flows through the magnetic field. The magnet 140 can be fabricated from any metallic magnetic materials or ferrite magnetic material. In one embodiment, higher magnetic induction intensity may be used to fabricate the magnet 140. The magnet structure could be integrated (such as C type, U type, or E type, etc.) or separated (e.g. flake shape pairs, block shape pairs, etc.).

As illustrated in FIG. 1, the MHD power generation unit 130 also includes a pair of electrodes 150 that are substantially in-line with the magnet 140 and substantially perpendicular to the magnetic field generated by the magnet 140. The electrodes 150 can be fabricated from any conductive material, such as, but not limited to, silver, copper, aluminum, conductive plastics, and the like. Although as shown in FIG. 1, the MHD power generation unit 130 includes a pair of electrodes 150, one will appreciate that additional pairs of electrodes could be employed. The electrodes 150 are further connected to a conductive element 160 that can be used to conduct the electrical power produced by the MHD 130 to a peripheral device for use or storage.

Figures 2A, 2B:
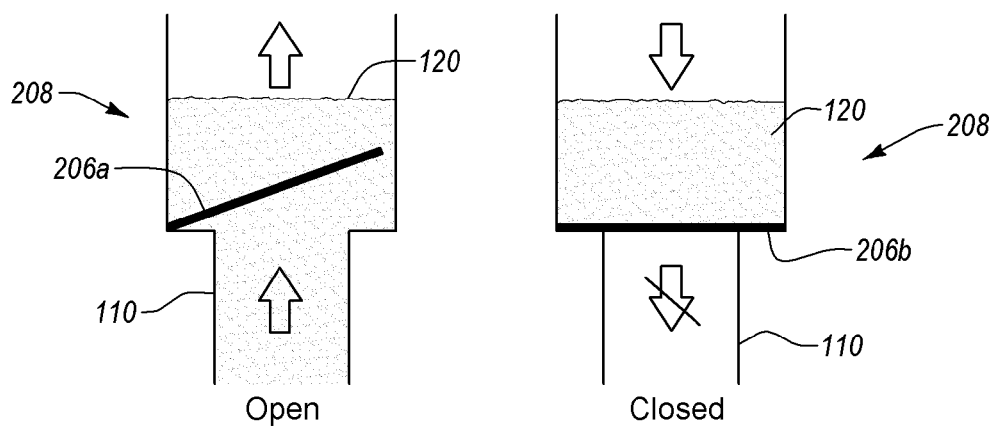
FIG. 2A provides a schematic of an illustrative embodiment of a one-way valve in an open position.
FIG. 2B provides a schematic of an illustrative embodiment of a one-way valve in a closed position.

In one embodiment, the fluid conduit 110 can be laid out to form a reciprocal flow path or a closed loop such that flow of the liquid conductive material 120 can be reciprocally coupled to electricity generation. In another embodiment, at least one valve can be included in the fluid conduit 110 to ensure unidirectional flow of liquid through the fluid conduit 110. Referring to FIGS. 2A and 2B, schematics of a one-way valve 208 included in the fluid conduit 110, in an opened 206a and a closed 206b position, are depicted.

The one way valve 208 depicted in FIGS. 2A and 2B is configured in the fluid conduit 110 of FIG. 1 such that it can at least partially restrict liquid 120 contained in the fluid conduit 110 to unidirectional flow. The one way valve 208 may include a flapper or a similar device or device that performs a similar function that can be opened to an opened position 206a by flow in a first direction, as indicated by up arrows, and that closes to a closed position 206b by flow in the opposite direction, as indicated by down arrows. Those having skill in the art will appreciate that other unidirectional valve designs can be used in other embodiments without departing from the spirit of the present disclosure.

Figure 3:
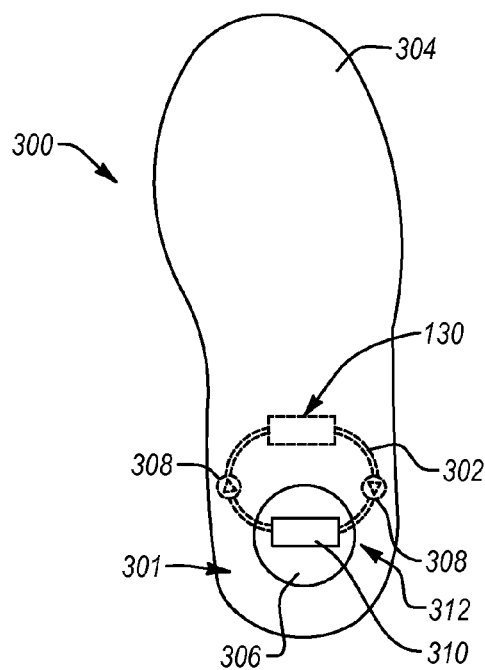
FIG. 3 provides a schematic of an illustrative embodiment of a footwear article that includes a liquid metal magnetohydrodynamic generator (LMMG).

Referring now to FIG. 3, a schematic of an illustrative embodiment of a footwear 300 article that includes a liquid metal magnetohydrodynamic generator (LMMG) 301 is depicted. In the depicted embodiment, the LMMG 301 is integrated into the sole portion 304 of the footwear article 300. In other embodiments, the footwear article 300 may be a boot, sandal, sock or any other type of foot covering with a surface that comes between foot and ground.

The LMMG 301 includes an MHD power generation unit 130 like the unit depicted in FIG. 1, a fluid conduit 302 laid out to form a reciprocal flow path, one way valves 308 in the fluid conduit 302 for ensuring unidirectional liquid metal flow through the fluid conduit 302, and a transducer 306 that is fluidly connected to the fluid conduit 302 to convert pressure between the ground and the wearer's foot into liquid metal flow. In an embodiment, the transducer 306 may include a flow cell 310 to form a flow cell transducer 312. In one embodiment, the transducer 306 is linked to the fluid conduit 306 and configured to harvest energy from body movement by driving flow of liquid metal through the fluid conduit 302 and, in turn, through the MHD power generation unit 130. In another embodiment, the transducer 306 may be described as a pressure sensitive cell configured to drive flow of the liquid metal through the fluid conduit 302 when a pressure is applied to the pressure sensitive cell. For example, the transducer 306 can be bladder, reservoir, vesicle, or another container made from a resilient or flexible material, such as an extruded thermoplastic material. When pressure is applied to the transducer 306 in the present example (i.e., pressing the footwear article 300 onto a ground), the transducer 306 can deform and force liquid metal to flow through the fluid conduit 302 and through the MHD power generation unit 130 for the generation of electrical power. In one embodiment, the transducer 306 and the fluid conduit 302 can both be made of a flexible/resilient material, such as but not limited to, extruded thermoplastic material such that the transducer 306 and the fluid conduit 302 can each be deformed in response to pressure between the foot and the ground.

Figure 4:
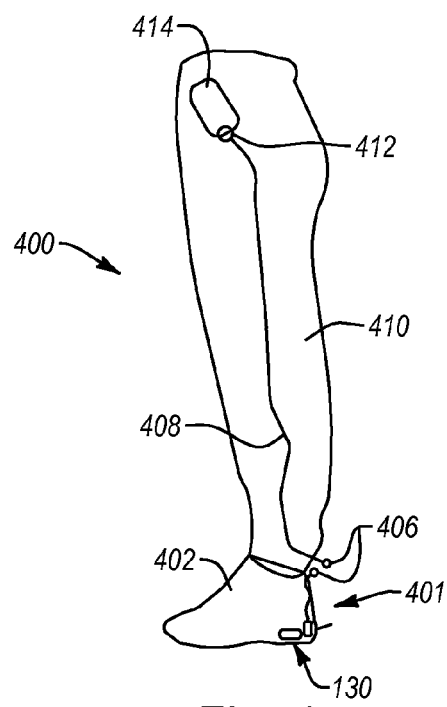
FIG. 4 provides a schematic of an illustrative embodiment of an LMMG system that includes a footwear article similar to the article depicted in FIG. 3.

Referring now to FIG. 4, a schematic of an illustrative embodiment of an LMMG system 400 that includes a footwear article 402 similar to the article depicted in FIG. 3 is depicted. The LMMG system 400 includes a shoe that includes an LMMG 401 with an MHD power generation unit 130 as described in reference to FIGS. 1 and 3. The system 400 further includes a conductive element with plugs 406 or similar connections for electrically connecting the LMMG 401 to a conductive element 408 in another article of clothing, such as but not limited to a pair of pants. In the example shown, the conductive element 408 is embedded in a leg portion of a pair of pants 410. The conductive element 408 runs up the pant leg and forms a conduit for transferring electrical power from the LMMG 401 to an electrical device 414. The conductive element 408 may be directly connected to the electrical device 414 or, as illustrated, the conductive element 408 may be connected to the electrical device 414 via plug 412. In one embodiment, the electrical device 414 is a device such as a portable music player, a phone, a GPS unit, or the like that is configured to use electrical power from the LMMG 401 as it is supplied. In another embodiment, the electrical device 414 may include a battery or another storage device configured to store the electrical power produced by the LMMG 401 for later use.

Figure 5:
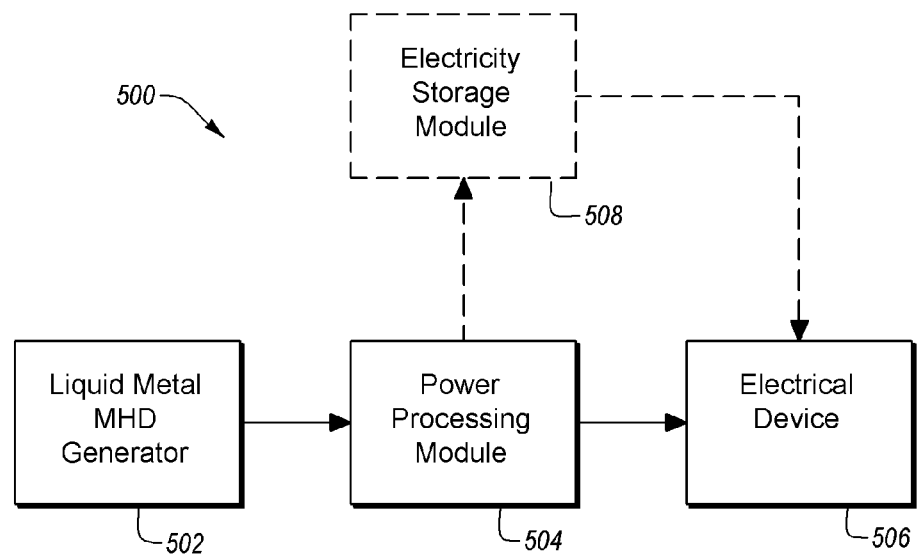
FIG. 5 provides a schematic diagram of an illustrative embodiment of an energy harvesting system that includes an LMMG.

Referring now to FIG. 5, a schematic block diagram of an illustrative embodiment of an energy harvesting system 500 that includes an LMMG 502 is depicted. The harvesting system 500 may include the device 100 or LMMG 300, instead of the LMMG 502. The energy harvesting system 500 depicted in FIG. 5 may, for example, be included in a system like that depicted in FIG. 4. In the depicted embodiment, the electrical power produced by the LMMG 502 is transferred to a power processing module 504, which may then transfer processed or conditioned electrical power to an electrical device 506. Alternatively, power from the power processing module 504 can be transferred instead to an electrical storage module 508 (e.g., a battery or a super capacitor) that can store the electrical power and transfer it to an electrical device when it is needed.

Figure 6:
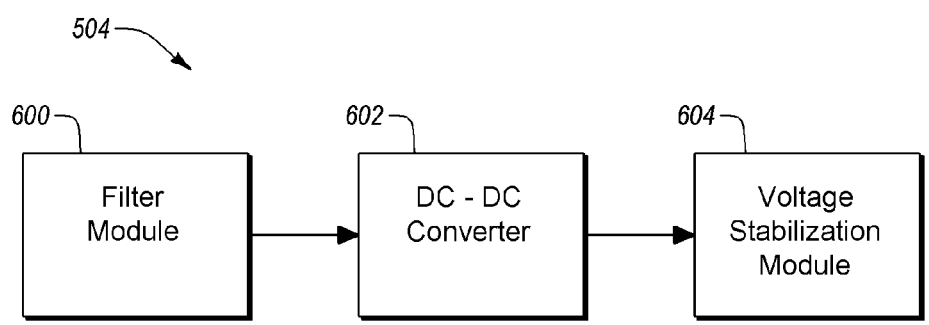
FIG. 6 provides a schematic diagram of an illustrative embodiment of a power processing module that can be included in the energy harvesting system of FIG. 5.

Referring now to FIG. 6, a schematic block diagram of an illustrative embodiment of the power processing module 504 of FIG. 5 is depicted. The power processing module 504 includes a filter module 600, a DC-DC converter 602, and a voltage stabilization module 604. By way of example and not of limitation, the filter module 600 may be configured to transform a fluctuating input power from the LMMG 502 into smooth power output with smaller voltage fluctuation. The DC-DC converter 602 can transform (raise or decrease) the output voltage of the filter module 600 to satisfy the voltage requirements of various electrical devices and appliances. The voltage stabilization module 604 can be configured to stabilize the output voltage to satisfy the voltage requirements of various electrical devices and appliances. One will appreciate that the DC-DC converter 602 can be replaced with a DC-AC converter as an alternating current power supply is desired in some embodiments.

Figure 7:
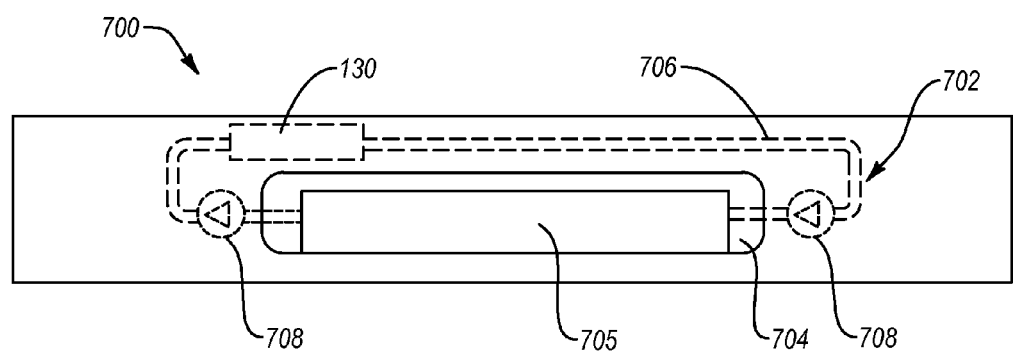
FIG. 7 provides a schematic of an illustrative embodiment of a flooring article that includes a liquid metal magnetohydrodynamic generator (LMMG).

Referring now to FIG. 7, a schematic of an illustrative embodiment of a flooring article 700 that includes a liquid metal magnetohydrodynamic generator (LMMG) 702 is depicted. The LMMG 702 is operatively coupled to the flooring article 700 for conversion of bio-kinetic energy to be applied to the flooring article 700 into electrical energy. In the depicted embodiment, the LMMG 702 includes a fluid conduit 706 configured to contain a liquid metal, a transducer 704 coupled to the fluid conduit 706 and configured to drive flow of the liquid metal through the fluid conduit 706, one way valves 708 to ensure unidirectional flow of liquid metal in the fluid conduit 706, and a magnetohydrodynamic (MHD) power generation unit 130 operatively coupled to the fluid conduit 706. As in the previously described embodiments, the MHD power generation unit 130 is configured to convert liquid metal flow through the fluid conduit 706 into electrical power.

The LMMG 702 can be embedded in the flooring article 700 such as, but not limited to, a flooring tile, carpeting, hardwood flooring, bamboo flooring, cork flooring, synthetic wood flooring, step risers, and combinations thereof for harvesting bio-kinetic energy, e.g., human/animal walking/running motion. The LMMG 702 can not only provide a new energy supply for room electrical equipment so as to, e.g., reduce building energy consumption, but also provide effective power supply that can be used during an interruption of power service (e.g., during a black-out). This is particularly suitable in areas where pedestrian flow is dense.

The various elements of the system may be similar to those incorporated in a wearable article, but may be in a larger scale. In some embodiments, the fluid conduit 706 and the MHD power generation unit 130 are embedded in the step/floor, while the transducer 704 (e.g., a pressure sensitive cell 705) is on the surface. The output electricity power can be either directly provided to room electrical equipments after being regulated, or can be transported to a storage component or the grid for storage and utilization.

A number of illustrative Examples will now be referred to. The Examples are intended solely to clarify the present disclosure and are not intended to limit the present disclose in any way.

EXAMPLES

Example 1

The Electricity Generating Capacity of a Model LMMG

The electricity generating capacity of a single LMMG can be analyzed using known physical principles. In particular, the electricity generating capacity of a single LMMG can be understood by analyzing the interactions between liquid metal flow and the magnetic field.

The coupling between the fluid flow and the magnetic field can be made clear on the basis of two fundamental effects: the induction of electric current due to movement of conducting liquid metal in a magnetic field; and the effect of Lorentz force as a result of electric current and magnetic field interaction. Liquid metal flow satisfies the Navier-Stokes equation, in which the electromagnetic implication of Lorentz force takes the form of $$F_{em} = \vec{J} \times \vec{B}.$$ Formula 1

Thus, the governing equation for a steady state, laminar, fully developed flow of an incompressible and viscous liquid metal in a rectangular duct, subjected to a constant and uniform magnetic field, can be derived from the Navier-Stokes equation, with Lorentz force taken into consideration:

$$\nabla p = \vec{j} \times \vec{B} + \mu_f \nabla^2 \vec{U} \quad \text{Formula 2}$$

where $\mu_f$ (Pa·s) is the dynamic viscosity, $\vec{j}$ (A/m$^2$) is the electric current density vector. $\vec{B}$ (tesla) and $\vec{U}$ (m/s) are the magnetic and velocity fields, respectively. In addition, according to Ohm's law, one has $\vec{j} = \sigma(\vec{E} + \vec{U} \times \vec{B})$, $\vec{E}$ (V/m) is the induced electric fields. Formulae for ducts having other cross-section profiles (e.g., circular, ovoid, square, etc.) can be derived based on the same principles.

It assumed that the transverse external magnetic field of intensity $B_0$ is imposed vertically to the normal of the duct's cross section (i.e., along the y direction). Also, liquid metal flows parallel along the z-axis, which is the axis of the duct.

Therefore, the NS equation governing these orthogonal fields in one-dimensional along the x-axis direction can be obtained as $$\frac{\partial p}{\partial x} = \sigma B_0 E_z - \sigma B_0^2 U_x + \mu_f \frac{d^2 U_x}{d y^2}. \quad \text{Formula 3}$$

Although the second-order non-homogeneous linear differential equation can be solved with the boundary conditions, it is much better to consider the impact of each force (Lorentz, friction, and viscosity) on the generating capacity, i.e., $$E_z = \frac{1}{\sigma B_0} \left( \frac{\partial p}{\partial x} + \sigma B_0^2 U_x - \mu_f \frac{d^2 U_x}{d y^2} \right). \quad \text{Formula 4}$$

Instead of the duct moving relative to the magnetic field, the liquid metal flows through the duct. This induced relative movement between the duct or the magnet and liquid metal is the velocity responsible for generating electricity, defined as generation velocity, or $U_g$. It is important to note that the generation velocity is the maximum velocity of the portion of liquid metal running transversely through the magnetic field. Therefore, according to the description of Stokes second problem, viscosity which damps the transmission of kinematical energy inside metal flow can be simplified as a damping coefficient $K_d$. Meanwhile, the shaking velocity of duct transferred to metal flow is characterized by friction coefficient $K_f$ since the dragging force of swinging duct partially dissipates in the form of friction. It is noteworthy in this implication that $K_d$ and $K_f$ are dependent on factors such as viscosity, magnetic and electrical conductivity, and must therefore be determined experimentally or empirically. Based on these assumptions, Formula can be simplified as:

$$E_z = K_d B_0 U_x - \frac{K_f p g}{\sigma B_0}. \quad \text{Formula 5}$$

By definition, then the open circuit voltage $V_{oc}$ of an LMMG can be calculated as the integral of electric field strength along the direction of electric field lines $$V_{oc} = \int_{-z_0}^{z_0} E_z dz = 2 z_0 \left( K_d B_0 U_x - \frac{K_f p g}{\sigma B_0} \right) \quad \text{Formula 6}$$

Example 2

A Model LMMG

To demonstrate the power generation property of a LMMG, a preliminary generator unit similar to the device depicted in FIG. 1 was constructed and tested.

The LMMG included a 100 mm long FRP (Fiberglass-Reinforced Plastics) duct, with an internal cross section of 2 mm×10 mm and wall thickness of 0.25 mm. A total mass of 5.68 g $Ga_{62}In_{25}Sn_{13}$ liquid metal alloys was sealed in the duct. The magnetic field is produced by NdFeB (neodymium iron boron) permanent magnets. The magnetic flux is conducted by silicon steel soft magnetic material, which thus forms a close loop magnetic circuit and produces an enhanced magnetic field strength along z direction. The C shape silicon steel for enhancing the magnetic field, 25 mm×52 mm×36 mm along each axis, contributes to more than 80% of the entire weight of 98 g. Both static magnetic field FEM analysis (Maxwell Ansoft) and magnetometer read 0.8 tesla (8000 gauss) uniform magnetic field strength along y-axis electrodes.

To imitate the low frequency oscillation excitation resembling that of body (hand, arm, leg, or torso), three amplitudes of travel distance are tested on a sinusoidal oscillation platform: 20 mm, 25 mm, 30 mm. For every oscillation amplitude, the vibration frequency is changed. Concerning every amplitude and frequency, 200 vibration periods is monitored as a single time measurement, and every measurement with the same parameters is repeated three times. Calculated afterwards, the frequency is monitored to be from 1.4 Hz to 2.8 Hz, in accordance with the swinging of a human arm while walking.

Figure 8:
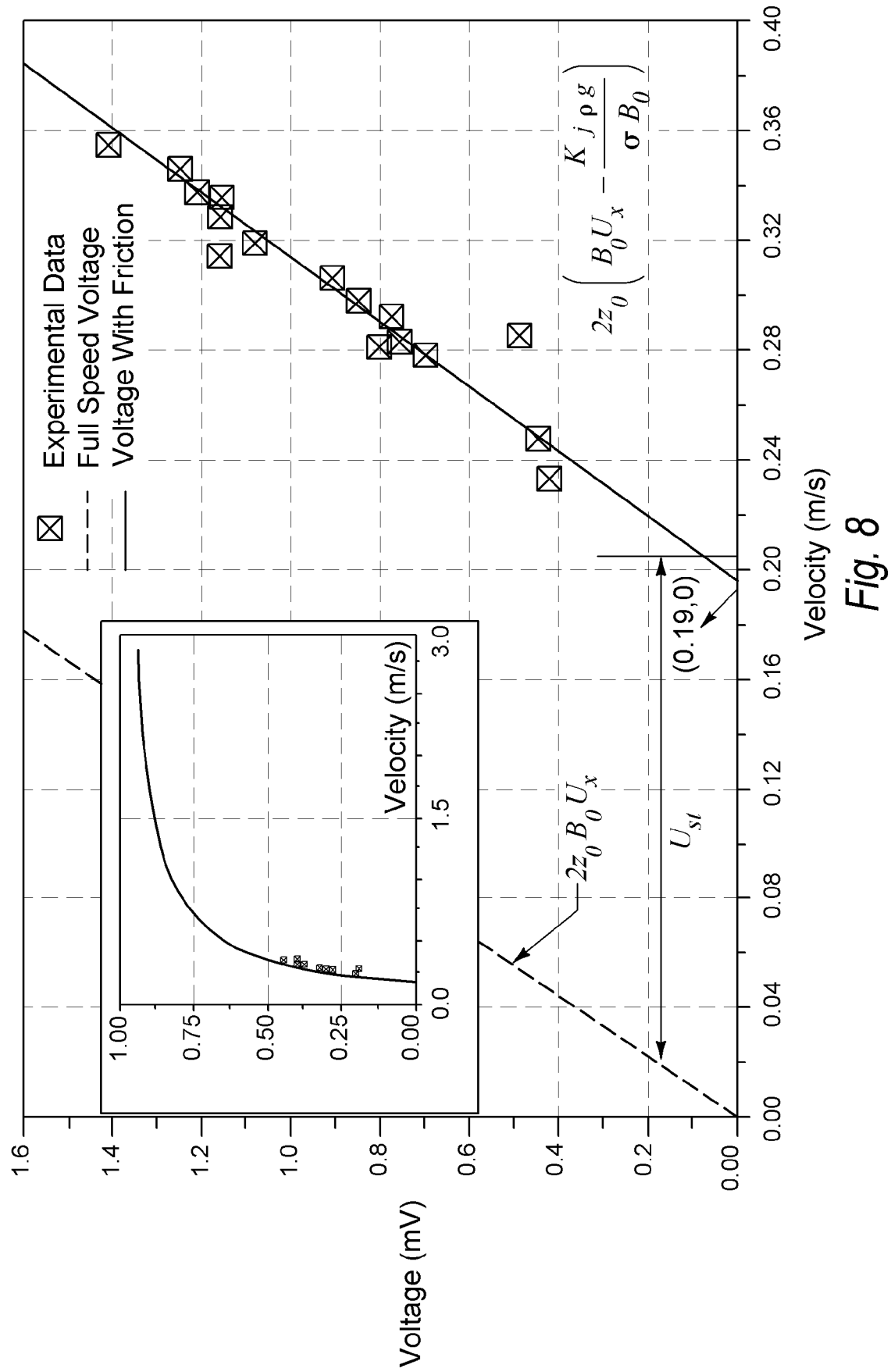
FIG. 8 illustrates the open current voltage of an example LMMG, according to one embodiment of the present disclosure.

When the excitation parameters are normalized into the velocity amplitude, the results in FIG. 8 show excellent agreement between experimental measurements (marked in square) and theoretical predictions (solid line from Formula 6), where friction coefficient $K_f$=1.45 and damping coefficient $K_d$=1 are defined experimentally. Further parameter analysis can reveal the existence of an ideal voltage (dash line) without friction, namely $U_g = U_x$ effective generating velocity equals to that of the duct.

An LMMG also has the advantage that it converts energy during simulated body movement into electricity via a rather high efficiency. As dashed out in FIG. 8, the ideal voltage (full speed generation) without any friction damping is parallel to the decelerated voltage line acquired both in experiment and theoretical derivation. It was surprising and unexpected to find that the generation efficiency (defined as the fiction and Hartmann effect decelerated voltage divided by ideal voltage without any friction, shown in the inset in FIG. 8) is about 45% in experiments and can reach more than 70% with a slightly increased velocity. Compared with a single thermal couple and a piezoelectric material with a generation efficiency of 5% and 17%, respectively, the LMMG could generate electricity much more efficiently. Due to the similarity of conversion mechanism, the efficiency here is similar to that of any solid metal generator, which ranges from 50% to 98% according to the efficiency enhancement technique employed. Higher efficiency of more than 90% LMMG is also restricted by the strong coupled electromagnetic field which will result in electromagnetic energy losses similar to that in the conventional generation principles.

Figure 9:
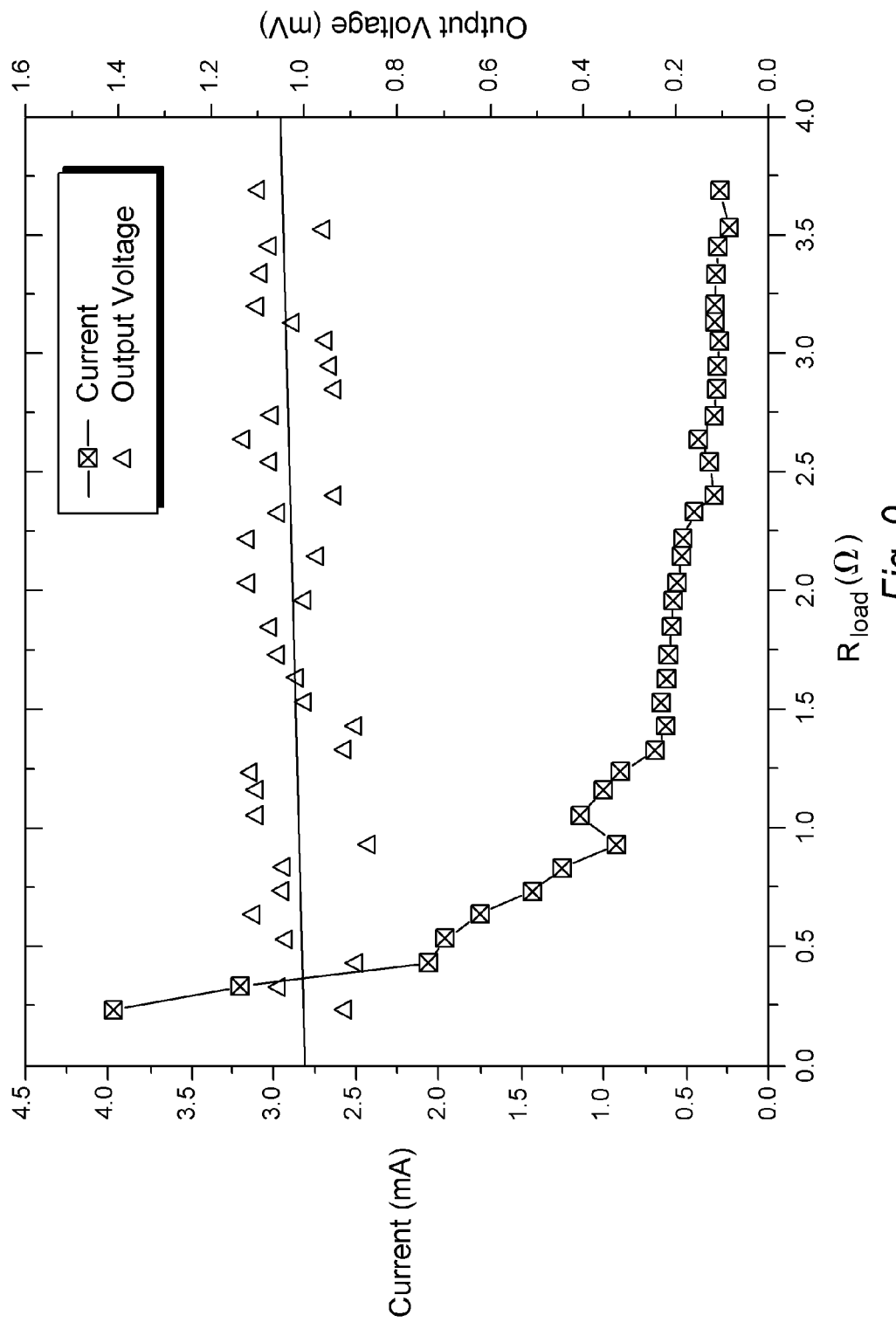
FIG. 9 illustrates the output voltage and the output current of an example LMMG at a variety of ohmic loads, according to one embodiment of the present disclosure.

Another advantage of LMMG lies in its robustness as a voltage source. Theoretically, a LMMG resembles a traditional electromagnetic generator and is equivalent to a series connection of a voltage source and an internal resistance. However, as the external resistance is changed from 0.13Ω to 3.63Ω (leads included, $V_{oc}$ to 1 mV), the current extracted by the load resistance is marked by squares in FIG. 9. Only a slight change in output voltage is observed. This phenomenon can be explained by the low internal resistance of the LMMG. From the definition of internal resistance $$R_{in} = \rho_e \frac{1}{S},$$

it can be estimated that the internal resistance of the LMMG $$R_{in} = \frac{z_0}{\sigma x_0 y_0} = 0.12 \text{ m}\Omega,$$

which is several orders of magnitude smaller than average leads (for example, the copper lead of 0.13Ω 40 cm×0.5 mm2 in this experiment, all resistance measured by Agilent 34420A). Therefore, the LMMG unit is robust enough in providing constant external voltage over a wide range of load resistance; as well as a power output of 3.61 μW.

Example 3

A Wearable Article Incorporating an LMMG

Figure 10A:
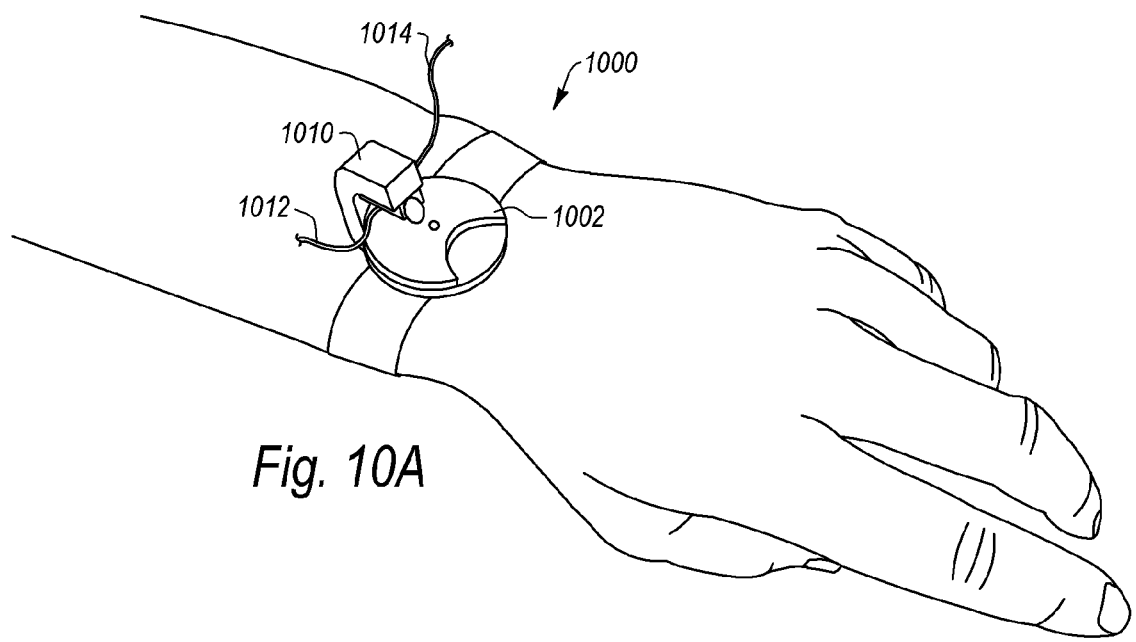
FIG. 10A provides a schematic of an illustrative embodiment of a wearable article that includes a liquid metal magnetohydrodynamic generator (LMMG) that may be worn on a wrist or another extremity.
Figure 10B:
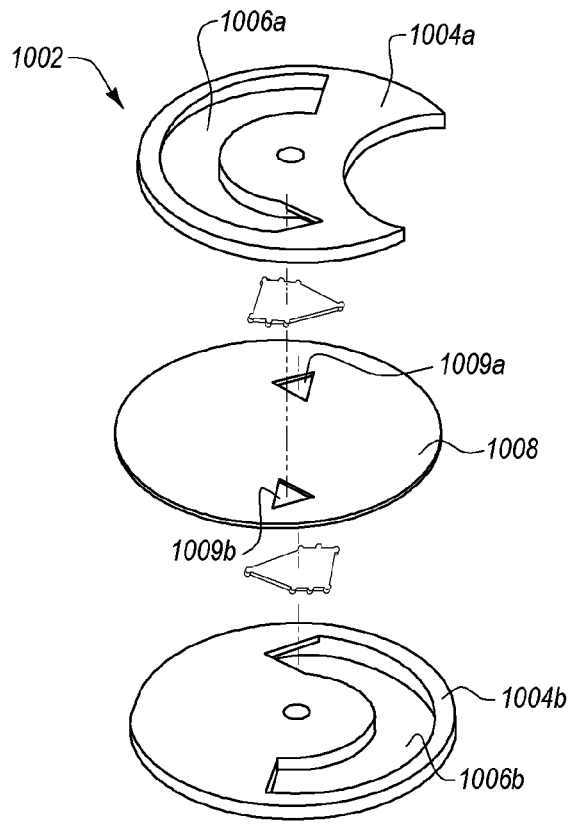
FIG. 10B provides a partial cut-away view of the article of FIG. 10A.

Following on the model experiment, a wearable article incorporating an LMMG was constructed in order to test whether the results shown with the test device discussed in Example 2 would hold up in a "real world" test. The wearable article 1000 is illustrated in FIGS. 10A and 10B. The wearable article 1000 includes a disk-shaped element 1002 that includes a fluid conduit for liquid metal flow, a magnet 1010 that is positioned over the disk-shaped element 1002 for coupling liquid metal flow to electricity generation, and a pair of electrical leads 1012 and 1014 that are connected to the fluid conduit for conducting electricity produced by the device 1000 to a peripheral device (not shown).

As illustrated in greater detail in partial cut-away view depicted in FIG. 10B, the disk-shaped element 1002 includes an upper disk 1004a and a lower disk 1004b. The upper and lower disks 1004a and 1004b include first and second semi-circular cut-out channels 1006a and 1006b. The disk-shaped element 1002 further includes upper and lower covers (not shown) that seal the first and second semi-circular cut-out channels 1006a and 1006b. Sandwiched between the upper and lower disks 1004a and 1004b is a middle disk 1008 that includes first and second through holes 1009a and 1009b that are positioned to permit liquid metal flow from the lower semi loop 1006b, to the upper semi loop 1006a, and back into the lower semi loop 1006b. To obtain a rectified direct current, the flow through the first and second through holes 1009a and 1009b is tuned to go through two micro-check-valves as illustrated in FIG. 3.

So configured, the device 1000 can be worn on the wrist or another part of an extremity and used to generate electrical power. In the wrist example, for instance, the swinging motion of the arm that is typical when walking causes liquid metal to flow through the disk-shaped element 1002 and through the magnetic field produced by magnet 1010 for the generation of electricity. Using a 0.8 T magnetic field to form a single generation unit, up to 5 mV open circuit voltage is generated in in vivo experiments during brisk walk.

When tens, hundreds, or thousands of these generation units are connected together, each tuned to its optimal direction defined as the deceleration direction of the attached tissues, they can thus generate electricity at an ultra low cost of harvest. The output power, a function of the relative velocity between the duct and the liquid, helps both the acceleration and deceleration of muscle cells when the location in body is properly defined.

Addition discussion of MHD and LMMG power generation units can be found in Dewei J I A, Jing L I U, Yixin Z H O U, "Harvesting human kinematical energy based on liquid metal magnetohydrodynamics", Physics Letters A, 373 (2009), 1305-1309, the entirety of which is incorporated herein by reference.

The present disclosure is not to be limited in terms of the particular examples described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

As used herein, the term "substantially" is used to mean to a great extent or degree. The term "substantially" is often used in conjunction with another term to describe the extent or degree of that term. For example, the term "substantially perpendicular" is used herein to indicate some degree of leeway in an angular measurement. That is, an angle that is substantially perpendicular may be 90°, but angles such as 45°, 60°, 65°, 70°, 75°, 80°, 85°, 95°, 100°, 105°, 110°, 115°, 120°, 125°, 130, or 135° are also "substantially perpendicular." Likewise, the term "substantially closed," as used herein, may indicate that something is mostly closed or usually closed, but that it need not be 100% closed or always closed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device, comprising:
    a fluid conduit configured to contain a liquid conductive material, and including at least one valve configured to ensure unidirectional flow of the liquid conductive material;
    a magnetohydrodynamic (MHD) power generation unit operatively coupled to the fluid conduit, wherein the MHD power generation unit is configured to convert liquid conductive material flow through the fluid conduit into electrical power; and
    a deformable transducer coupled to the fluid conduit, the deformable transducer positioned and configured to force liquid to flow through the fluid conduit and through the MHD power generation unit in response to an applied pressure to the deformable transducer.

2. The device of claim 1, wherein the deformable transducer is configured to harvest body movement to drive flow of the liquid conductive material through the fluid conduit.

3. The device of claim 2, wherein the deformable transducer includes a pressure sensitive cell configured to drive the flow of the liquid conductive material through the fluid conduit when a pressure is applied to the pressure sensitive cell.

4. The device of claim 2, wherein the deformable transducer includes a flow cell configured to drive the flow of the liquid conductive material through the fluid conduit when the device is moved.

5. The device of claim 1, wherein the device is integrated into a wearable article or a building element for conversion of bio-kinetic energy into electrical energy.

6. The device of claim 1, wherein the MHD power generation unit includes:
    a magnet configured to form magnetic field lines, wherein the magnetic field lines are aligned substantially perpendicular to the flow path of the liquid conductive material; and
    at least one pair of electrodes coupled to the fluid conduit substantially perpendicular to the magnetic field lines, wherein the electrodes are configured to collect an output electrical current produced by the MHD power generation unit.

7. The device of claim 6, further comprising a conductive element coupled to the electrodes, wherein the conductive element is configured to conduct the output electrical current collected by the electrodes and to deliver the output electrical current to a peripheral device.

8. The device of claim 6, wherein the magnet has a magnetic field strength in a range from about 10 gauss (G) to about 20,000 G.

9. The device of claim 1, wherein the liquid conductive material is a liquid metal including one or more of mercury, potassium, sodium, gallium, indium, tin, or zinc.

10. The device of claim 9, wherein the liquid metal is a gallium alloy, comprising:
    about 20 to about 95 weight percent gallium;
    about 0 to about 30 weight percent indium;
    about 5 to about 60 weight percent tin; and
    about 0 to about 20 weight percent zinc.

11. The device of claim 1, wherein the liquid conductive material is a molten salt including an aluminum halide and at least one of a 1,3-dialkylimidazolium halide, a 1,2,3-trialkylimidazolium halide, or a N-alkylpyridinium halide, quaternary ammonium salts based on the bis(trifluoromethylsulfonyl)imide and triflate anions, and 2 Ethyl-methylimidazolium bis(trifluoromethane-sulfonyl)imide (EMI-TFSI).

12. A wearable article, comprising:
    a liquid metal magnetohydrodynamic generator (LMMG) configured to convert bio-kinetic energy into electrical energy, the LMMG including:
        a fluid conduit configured to contain a liquid metal, and including at least one valve configured to ensure unidirectional flow of the liquid conductive material;

a magnetohydrodynamic (MHD) power generation unit operatively coupled to the fluid conduit, wherein the MHD power generation unit is configured to convert liquid metal flow through the fluid conduit into electrical power; and a deformable transducer coupled to the fluid conduit, the deformable transducer positioned and configured to force liquid to flow through the fluid conduit and through the MHD power generation unit in response to an applied pressure to the deformable transducer.

13. The wearable article of claim 12, further comprising, a conductive element linked to the MHD, wherein the conductive element is configured to conduct the electrical power produced by the MHD to a peripheral device.

14. The wearable article of claim 12, wherein the wearable article includes a clothing article, a footwear article, or a wearable accessory.

15. The wearable article of claim 14, wherein the wearable article comprises a footwear article that includes a pressure sensitive cell configured to be compressed during body locomotion to drive the flow of the liquid metal through the fluid conduit when a pressure is applied to the pressure sensitive cell.

16. The wearable article of claim 14, wherein the wearable article comprises a bangle or band configured to be worn on a wrist or ankle portion of an arm or leg, and wherein the bangle or band includes a flow cell transducer adapted to couple flow of the liquid metal through the fluid conduit in response to one or more arm or leg movements.

17. A building element, comprising:

a liquid metal magnetohydrodynamic generator (LMMG) integrated into the building element for conversion of bio-kinetic energy into electrical energy, the LMMG including:

a fluid conduit configured to contain a liquid metal;

a magnetohydrodynamic (MHD) power generation unit operatively coupled to the fluid conduit, wherein the MHD power generation unit is configured to convert liquid metal flow through the fluid conduit into electrical power; and a deformable transducer coupled to the fluid conduit, the deformable transducer positioned and configured to force liquid to flow through the fluid conduit and through the MHD power generation unit in response to an applied pressure to the deformable transducer.

18. The building element of claim 17, wherein the building element further comprises a conductive element coupled to the MHD, wherein the conductive element is configured to conduct the electrical power produced by the MHD to a peripheral device.

19. The building element of claim 17, wherein the building element is a flooring article in which the deformable transducer includes a pressure sensitive cell configured to drive flow of the liquid metal through the fluid conduit when a pressure is applied to the pressure sensitive cell by pressures applied to the flooring article.

* * * * *